United States Patent
Walsdorff et al.

(10) Patent No.: US 12,053,760 B2
(45) Date of Patent: Aug. 6, 2024

(54) CATALYST, CATALYST CARRIER OR ABSORBENT MONOLITH OF STACKED STRANDS

(71) Applicants: BASF SE, Ludwigshafen am Rhein (DE); VITO NV, Mol (BE)

(72) Inventors: Christian Walsdorff, Ludwigshafen am Rhein (DE); Marco Oskar Kennema, Ludwigshafen am Rhein (DE); Miguel Angel Romero Valle, Ludwigshafen am Rhein (DE); Florian Scharf, Ludwigshafen am Rhein (DE); Dirk Hensel, Ludwigshafen am Rhein (DE); Juergen Zuehlke, Ludwigshafen am Rhein (DE); Fred Borninkhof, De Meern (NL); Bart Michielsen, Mol (BE); Jasper Lefevere, Mol (BE)

(73) Assignees: BASF SE, Ludwigshafen am Rhein (DE); VITO NV, Mol (BE)

( * ) Notice: Subject to any disclaimer, the term of this patent is extended or adjusted under 35 U.S.C. 154(b) by 621 days.

(21) Appl. No.: 17/291,157

(22) PCT Filed: Nov. 4, 2019

(86) PCT No.: PCT/EP2019/080103
§ 371 (c)(1),
(2) Date: May 4, 2021

(87) PCT Pub. No.: WO2020/094570
PCT Pub. Date: May 14, 2020

(65) Prior Publication Data
US 2022/0072524 A1    Mar. 10, 2022

(30) Foreign Application Priority Data
Nov. 5, 2018   (EP) .................................... 18204397

(51) Int. Cl.
*B01J 23/22*   (2006.01)
*B01J 8/02*    (2006.01)
(Continued)

(52) U.S. Cl.
CPC ................. *B01J 23/22* (2013.01); *B01J 8/02* (2013.01); *B01J 35/19* (2024.01); *B01J 35/31* (2024.01);
(Continued)

(58) Field of Classification Search
CPC .......... B01J 23/32; B01J 8/02; B01J 35/0006; B01J 35/0026; B01J 35/023; B01J 35/04;
(Continued)

(56) References Cited

U.S. PATENT DOCUMENTS

| | | | |
|---|---|---|---|
| 4,464,482 A * | 8/1984 | Bird .......................... | C07C 5/10 502/344 |
| 6,027,326 A | 2/2000 | Cesarano et al. | |

(Continued)

FOREIGN PATENT DOCUMENTS

| | | |
|---|---|---|
| CN | 108136385 A | 6/2018 |
| EP | 3381546 A1 | 10/2018 |

(Continued)

OTHER PUBLICATIONS

Taylor et al., "Iron and Nickel Cellular Structures by Sintering of 3D-Printed Oxide or Metallic Particle Inks," Advanced Engineering Materials, vol. 19, Issue 11, 2017, pp. 1-8.
(Continued)

*Primary Examiner* — Patricia L. Hailey
(74) *Attorney, Agent, or Firm* — Faegre Drinker Biddle & Reath LLP (57) ABSTRACT

A three-dimensional porous catalyst, catalyst carrier or absorbent monolith of stacked strands of catalyst, catalyst carrier or absorbent material, composed of alternating layers
(Continued)

of linear spaced-apart parallel strands, wherein the strands in alternating layers are oriented at an angle to one another, wherein the distance between inner spaced-apart parallel strands is larger than the distance between outer spaced-apart parallel strands in at least a part of the layers of the monolith.

23 Claims, 8 Drawing Sheets

(51) Int. Cl.
    *B01J 35/00* (2024.01)
    *B01J 35/31* (2024.01)
    *B01J 35/40* (2024.01)
    *B01J 35/56* (2024.01)
    *B01J 35/58* (2024.01)
    *B01J 35/61* (2024.01)
    *B01J 37/00* (2006.01)
    *B01J 37/08* (2006.01)
    *B22F 1/10* (2022.01)
    *B22F 10/18* (2021.01)
    *B22F 12/53* (2021.01)

(52) U.S. Cl.
    CPC .............. *B01J 35/40* (2024.01); *B01J 35/56* (2024.01); *B01J 35/58* (2024.01); *B01J 35/618* (2024.01); *B01J 37/0009* (2013.01); *B01J 37/08* (2013.01); *B22F 10/18* (2021.01); *B22F 1/10* (2022.01); *B22F 12/53* (2021.01)

(58) Field of Classification Search
    CPC .... B01J 35/06; B01J 35/1029; B01J 37/0009; B01J 37/08; B22F 10/18; B22F 12/53; B22F 1/10
    USPC .............. 502/104, 305–355, 527.24, 527.16, 502/527.17, 527.19; 264/464, 638, 642, 264/681–683
    See application file for complete search history.

(56) References Cited

U.S. PATENT DOCUMENTS

| | | | |
|---|---|---|---|
| 6,401,795 | B1 | 6/2002 | Cesarano et al. |
| 6,797,220 | B2 * | 9/2004 | Mulligan .............. C04B 35/638 264/642 |
| 6,993,406 | B1 | 1/2006 | Cesarano et al. |
| 7,527,671 | B1 | 5/2009 | Stuecker et al. |
| 8,119,554 | B2 | 2/2012 | Kashani-Shirazi et al. |
| 9,597,837 | B1 | 3/2017 | Cesarano, III et al. |
| 2002/0140139 | A1 * | 10/2002 | Sutaria .................... C04B 35/56 264/670 |
| 2004/0170804 | A1 | 9/2004 | Niknafs et al. |
| 2005/0065028 | A1 * | 3/2005 | Pellin ...................... B01J 23/22 502/527.24 |
| 2018/0297272 | A1 * | 10/2018 | Preston .................. B33Y 50/02 |
| 2022/0048013 | A1 | 2/2022 | Mullens et al. |
| 2022/0314209 | A1 * | 10/2022 | Kennema ............. B01J 37/0018 |

FOREIGN PATENT DOCUMENTS

| | | | | |
|---|---|---|---|---|
| EP | 3647019 | A1 * | 5/2020 | ............. B29C 64/10 |
| WO | WO-02062466 | A2 * | 8/2002 | ......... B01J 19/2495 |
| WO | 2017/055565 | A1 | 4/2017 | |
| WO | 2018/099956 | A1 | 6/2018 | |
| WO | WO-2021013652 | A1 * | 1/2021 | ............... F01N 3/28 |

OTHER PUBLICATIONS

International Preliminary Report on Patentability received for PCT Patent Application No. PCT/EP2019/080103, mailed on May 20, 2021, 7 pages.

International Search Report and Written Opinion received for PCT Patent Application No. PCT/EP2019/080103, mailed on Jan. 13, 2020, 9 pages.

* cited by examiner

CATALYST, CATALYST CARRIER OR ABSORBENT MONOLITH OF STACKED STRANDS

CROSS-REFERENCE TO RELATED APPLICATIONS

This application is a national stage application (under 35 U.S.C. § 371) of PCT/EP2019/080103, filed Nov. 4, 2019, which claims benefit of European Application No. 18204397.6, filed Nov. 5, 2018, both of which are incorporated herein by reference in their entirety.

The invention relates to a three-dimensional porous catalyst, catalyst support or absorbent monolith of stacked strands, a method for producing the monolith and the use of the monolith.

Typically, inorganic catalysts, catalyst supports or absorbents are produced as extruded strands or extruded monolith or honeycomb structures.

Alternative processes which allow for a greater variety of shapes in comparison to a linear stretched honeycomb structure can be prepared e.g. by rapid prototyping processes. The process described in U.S. Pat. No. 8,119,554, for example, involves the production of a shaped body by means of a powder-based rapid prototyping process, in which a binder material is selectively introduced in an inorganic catalyst powder to form the three-dimensional structure.

A further production process often named robocasting can be employed. In this method, a paste of the catalyst material particles is extruded into strands which are deposited in stacked layers to form the desired three-dimensional structure. Subsequently, the structure is dried and sintered. The production of regenerable diesel soot particulate filters by robocasting methods is disclosed in U.S. Pat. No. 7,527,671.

This method has also been employed for preparing $Cu/Al_2O_3$ catalytic systems with a wood pile porous structure. Journal of Catalysis 334 (2016), 110 to 115, relates to the 3D printing of a heterogeneous copper-based catalyst. $Al_2O_3$ powder with a mean particle size of 0.5 µm was added to an aqueous solution of copper(II) nitrate, and the viscosity of the resulting suspension was adjusted by adding hydroxypropyl methyl cellulose as viscosity modifier. The resulting ink was concentrated by the removal of water by evaporation until suitable for extrusion. The aqueous ink was loaded into a syringe attached by a nozzle with a diameter of 410 µm. A robotic deposition system was used to create the woodpile structures. The structure was dried at room temperature for 24 h and subsequently sintered at 1400° C. for 2 h in air.

$Ni/Al_2O_3$-coated structured catalysts are disclosed in Catalysis Today, 273 (2016), pages 234 to 243. To prepare the catalyst, stainless steel supports were prepared using the robocasting process. The resulting 3D structures were sintered at 1300° C. for 4 h and a coating slurry of boehmite powder with nickel loading was applied. Thus, only the stainless steel support structure was prepared by robocasting.

All the above-mentioned processes need a sintering step at temperatures well above 1000° C.

For a number of catalysts employing catalytically active metals, such sintering at high temperatures is detrimental to the catalyst properties. Typically, the dispersion of the catalytically active metal on a catalyst support deteriorates upon this temperature treatment.

To obtain high external surface areas for the catalysts, e.g. for diffusion limited reactions, or high packing fractions with low void volume, in fixed-bed catalyst reactors, the use of smaller catalyst extrudates is necessary. In mass transfer limited reactions the performance of small catalyst extrudates is better than that of larger extrudates, especially in mass-transfer limited reactions. A disadvantage, however, is that smaller extrudates show a higher pressure drop in the packed bed. Furthermore, the mechanical strength of these small extrudates is typically not sufficient to form a packed bed reactor.

WO 2017/055565 A1 discloses a method of building a bulk catalytic structure, comprising: shaping a composition comprising a ceramic material to obtain a green structure, wherein said ceramic material comprises a catalytic material and a first and a second inorganic binder; firing the green structure to obtain the bulk catalytic structure, wherein the structure comprises first channels having a length extending in a flow direction and second channels having a length extending in a radial direction, wherein the shaping step comprises extruding the suspension, slurry or paste as fibers by three-dimensional fiber deposition, wherein the fibers form a layered network.

The layered network comprises alternating layers of fibers parallel to one another, wherein the fibers in successive layers are arranged orthogonal or oblique to one another.

In a preferred embodiment, the alternating layers comprise a first alternate layer and a second alternate layer, wherein the fibers in successive ones of the first alternate layer is aligned and wherein the fibers in successive ones of the second alternate layers is aligned.

U.S. Pat. No. 9,597,837 B1 discloses a method for making a three-dimensional porous fluidic device comprising: depositing struts and walls in the three-dimensional geometry using a rapid-prototyping method to construct a three-dimensional porous fluidic device, the three-dimensional porous fluidic device comprising: a fluidic inlet side and an outlet side; a wall surrounding the fluidic device; within the wall of the fluidic device a lattice of a plurality of struts positioned in layers forming a network of pores wherein the struts in the first layer are separated from the struts in a third layer by struts in a second layer which are arranged at an angle to the struts in the first layer and the third layer and wherein the struts in the third layer and the first layer are offset in spacing and wherein the struts within a layer are separated from an adjacent strut within the layer by a space such that channels having a tortuous pathway of interconnecting pores is formed.

The object underlying the present invention is to provide a catalyst including a catalytically active metal which has a high external surface area or high packing fraction. The catalyst structure should be sufficiently mechanically stable so that packed catalyst beds can be formed in a reactor.

A further object is to provide a catalyst shaping process in which prefabricated supported catalysts can be employed.

Current catalysts prepared through robocasting have a large surface area. However, they also have a high pressure drop across the individual monolith bodies, which in turn, result in a high pressure drop across a reactor where these monolith bodies would be placed. Alternatively, a bed of randomly packed monoliths may have a low pressure drop in a reactor, but the entrance barrier into the monoliths due to the pressure drop across each individual monolith body would lead to channeling of the gas flow through the reactor, and the improvement in the geometric surface area provided by the robocasting technique would not be fully utilized.

The object is achieved according to the present invention by a method for producing a three-dimensional porous catalyst, catalyst carrier or absorbent monolith of stacked strands, comprising catalyst, catalyst carrier or absorbent material, comprising the following steps:
- a) Preparing a paste of metal, metal alloy, metal compound particles of catalytically active metal or catalyst support particles in a liquid diluent, in which the metal, metal alloy or metal compound particles can be supported on or mixed with catalyst support particles, and which paste can optionally comprise a binder material,
- b) extruding the paste of step a) through one or more nozzles having a diameter larger than 500 µm to form strands, and depositing the extruded strands in alternating layers of linear spaced-apart parallel strands, wherein the alternating layers are oriented at an angle to one another, to form a three-dimensional porous monolith precursor,
- c) drying the porous monolith precursor to remove the liquid diluent,
- d) if necessary, reducing metal oxide(s) in the porous monolith precursor to form the catalytically active metal or metal alloy, or additional heat treatment to produce a catalytically active material,
  wherein the distance between inner spaced-apart parallel strands is larger than the distance between outer spaced-apart parallel strands in at least a part of the layers of the monolith.

The layer pattern and layer organization of the monolith structures of the invention leads to a significant decrease in pressure drop across each individual monolith body. This results in a lower pressure drop across a reactor filled with the monoliths of the invention and a more homogeneous flow through the reactor bed filled with a random packing of individual monoliths.

In this respect, a three-dimensional monolith is a one-piece structure made of at least two stacked layers of strands.

In general, the strands are deposited orthogonal or oblique to each other in alternating layers. The orientation of the strands in each consecutive layer can be rotated by a certain angle, e.g. by 90°, 60°, 450 or 36°, clockwise or anti-clockwise, with respect to the preceding layer. Channels are formed in the monolith by superposition of individual layers of parallel strands having different orientations. The monoliths of the invention have smaller outer channels and larger inner channels resulting from the different spacing of the strands.

In one embodiment, the strands are deposited in alternating layers comprising first and second alternate layers, wherein the strands in the first alternate layers are each aligned and in the second alternate layers are each aligned, and wherein the strands in the first and second alternate layers are orthogonal to one another. The monolith can have a square or rectangular cross-section in this case. However, a square or rectangular monolith is less preferred.

In a further embodiment, the strands are deposited in alternating layers comprising first, second and third alternate layers, wherein the strands in the first alternate layers, in the second alternate layers and in the third alternate layers are each aligned, and wherein the strands in first, second and third alternate layers are oriented at 60° and 120°, respectively, to one another. Preferably, the catalyst monolith has a hexagonal cross-section in this case.

In a further embodiment, the strands are deposited in alternating layers comprising first, second, third and forth alternate layers, wherein the strands in the first alternate layers, in the second alternate layers, in the third alternate layers and in the forth alternate layers are each aligned, and wherein the strands in the first, second, third and fourth alternate layers are oriented at 45°, 90° and 135°, respectively, to one another other. Preferably, the catalyst monolith has an octagonal cross-section in this case.

The monolith can have any other suitable cross-section, for example a triangular, pentagonal or circular cross-section. A triangular catalyst monolith can have sequences of three different alternate layers oriented at 60° and 120°, respectively, to one another. A pentagonal monolith may have a sequences of five different alternate layers, oriented at 36°, 72°, 108° and 144°, respectively, to one another.

The distance between spaced-apart parallel strands increases form the periphery towards the center in at least a part of the layers of the monolith. Pairs of parallel strands more close to the periphery are less spaced apart than some or all of the remaining pairs of parallel strands more close to the center of the monolith body. Preferably, the distance between spaced-apart parallel strands in a layer increases form the periphery towards the center in all of the layers of the monolith body.

In a preferred embodiment, the parallel strands in a layer have primary and secondary distances, wherein the secondary distance between inner (more central) parallel strands is larger than the primary distance between outer (more peripheral) parallel strands. The ratio of the larger, secondary inter-strand distance to the smaller, primary inter-strand distance is preferably in the range of from 1.2:1 to 5:1, for examples 1-7, 3.5:1.

It is also possible to have three or more different inter-strand distances between pairs of parallel strands in a layer.

The number of parallel strands in each individual layer is given in general by the formula:

$$n = a/(b*c)$$

Where "n" is the number of parallel strands in a given layer, determined by the maximum outer diameter "a" of the monolith, divided by the product of the diameter "b" of the strands of the strands with a factor "c".

The factor c is in general from 1.5 to 3.5, preferably from 1.8 to 3 and most preferably from 2 to 3.

Preferably, the parallel strands in each layer are partial strands deposited in a continuous manner as part of one single individual strand, the one single individual strand having corners and changing its direction in the plane of the layer.

In preferred embodiments, the outer periphery of the catalyst monolith is created by depositing in some or all of the layers, preferably in all of the layers, a strand that forms a frame of the layers defining the outer perimeter of the monolith. The outermost strands are thus part of the frame. The stacked frames of each layer result in a solid lateral wall of the catalyst monolith.

The invention is further illustrated with reference to FIGS. 1 to 30.

FIG. 2 or FIG. 3, are deposited perpendicular to one another.

FIG. 6 or FIG. 7, are deposited perpendicular to one another.

FIG. 11 shows a non-inventive octagonal catalyst monolith design in a top view with channels perpendicular to the layers. A minimum of 4 layers, according to either FIG. 9 or FIG. 10, are deposited at 45°, 90° and 135°, respectively, to one another.

FIG. 14 shows an improved catalyst monolith design in a top view with channels perpendicular to the layers. A minimum of 4 layers, according to either FIG. 12 or FIG. 13, are deposited at 45°, 90° and 135°, respectively, to one another.

FIG. 18 shows a non-inventive hexagonal catalyst monolith design in a top view with channels perpendicular to the layers. A minimum of 3 layers, according to either FIG. 16 or FIG. 17, are deposited at 60° and 120°, respectively, to one another.

FIG. 21 shows an improved catalyst monolith design in a top view with channels perpendicular to the layers. A minimum of 3 layers, according to either FIG. 19 or FIG. 20, are deposited at 60° and 120°, respectively, to one another. The parallel strands are oriented perpendicular to the sides of the hexagon.

FIG. 24 shows an improved catalyst monolith design in a top view with channels perpendicular to the layers. A minimum of 3 layers, according to either FIG. 19 or FIG. 20, are deposited at 60° and 120°, respectively, to one another. The parallel strands are oriented parallel to the sides of the hexagon.

The present invention also relates to catalyst monoliths obtainable by the method.

More generally, the present invention also relates to a three-dimensional porous catalyst, catalyst carrier or absorbent monolith of stacked strands of catalyst, catalyst carrier or absorbent material, composed of alternating layers of linear spaced-apart parallel strands, wherein the strands in alternating layers are oriented at an angle to one another, wherein the distance between inner spaced-apart parallel strands is larger than the distance between outer spaced-apart parallel strands in at least a part of the layers of the monolith.

In preferred embodiments, the strands are arranged in alternating layers comprising first and second alternate layers, wherein the strands in the first alternate layers and in the second alternate layers are each aligned, and wherein the strands in successive layers are orthogonal to each other. The monolith has preferably a square or rectangular cross section.

In further preferred embodiments, the strands are arranged in alternating layers comprising first, second and third alternate layers, wherein the strands in the first alternate layers, in the second alternate and in the third alternate layers are each aligned, and wherein the strands in the alternate layers are oriented at 60° and 120°, respectively, to one another. The monolith has preferably a hexagonal cross section.

In further preferred embodiments, the strands are arranged in alternating layers comprising first, second, third and forth alternate layers, wherein the strands in the first alternate layers, in the second alternate, in the third alternate layers and in the forth alternate layers are each aligned, and wherein the strands in the alternate layers are oriented at 45°, 90° and 135°, respectively, to one another. The monolith has preferably an octagonal cross section.

In further preferred embodiments, in some or all of the layers a strand is arranged that forms a frame of the layer defining the outer periphery of the catalyst monolith.

Preferably, in some or all of the layers the parallel strands are enclosed by a frame of extruded strand having a circular or polygonal shape. In a particular preferred embodiment, in all layers the parallel strands are enclosed by a frame, the staggered frames resulting in a solid lateral wall of the catalyst monolith.

Formulations also used in standard extrusion processes are in principle suitable as pasty suspensions. It is a prerequisite that the particle size of the catalyst precursor material is sufficiently small for the microextrusion nozzle. The largest particles (d99 value) should preferably be at least five times smaller, in particular at least ten times smaller, than the nozzle diameter.

Suitable formulations exhibit the rheological properties necessary for microextrusion. The abovementioned literature describes in detail how suitable rheological properties may be established. If necessary, binders and viscosity-modifying additions such as starch or carboxymethylcellulose may be added to the formulations.

The microextrudable pasty suspension preferably contains water as liquid diluent but organic solvents may also be employed. The suspension may contain not only catalytically active compositions or precursor compounds for catalytically active compositions but also an inorganic support material or inert material. Examples of commonly used support or inert materials, which may also be catalytically active per se in certain reactions, are silicon dioxide, aluminum oxide, diatomaceous earth, titanium dioxide, zirconium dioxide, magnesium oxide, calcium oxide, hydrotalcite, spinels, perovskites, metal phosphates, metal silicates, zeolites, steatites, cordierites, carbides, boron nitrides, metal-organic frame works and mixtures thereof.

The process according to the invention may also be used to produce shaped bodies essentially comprising only a support material or an inert material. Such shaped bodies produced by the process according to the invention may then be converted into catalyst shaped bodies in further process steps, for example by impregnation or coating and optionally further thermal treatment steps.

Metal, metal alloy or metal oxide particles of catalytically active metals or metal alloys can be employed in a robocasting process, wherein no treatment or sintering step at temperatures above 1000° C. is necessary in order to obtain mechanically stable catalytically active structures.

When employing metals, metal alloys or metal oxides, supported on or mixed with inorganic oxide catalyst support particles, a high dispersion of the catalytically active metal or metal alloy can be achieved since no temperature treatment at temperatures above 1000° C. is necessary. Often, such temperature treatment leads to a lowering of the dispersion of the catalytically active metal or alloy.

Powders of prefabricated supported catalysts, with catalytically active metals being in oxide form, if appropriate, can be formed in a robocasting process without significantly changing their properties, e.g. active metal dispersion on the catalyst support. According to the above-mentioned known processes, supported catalysts were obtained at the end of the robocasting and sintering only.

The robocasting process allows for the manufacture of three-dimensional porous catalyst monolith structures of stacked catalyst fibers, which have an increased external surface area in comparison to normal extrudates.

This leads to higher activity and selectivity due to increased external surface area in diffusion-limited reactions, like hydrogenation reactions, oxidation reactions, or dehydration reactions.

An example of a hydrogenation reaction is that of butanal to butanol or butyne diol hydrogenation.

Furthermore, heat transport limited reactions like oxidation reactions, e.g. ethylene oxide reaction, can be envisaged.

A low pressure drop is possible, thus allowing to work with smaller fiber diameters compared to single extrudates.

The invention also relates to a randomly packed catalyst bed, comprising the porous catalyst monoliths of stacked catalyst strands of the invention.

When starting from powders of prefabricated catalysts, the original active metal (oxide) dispersion on the catalyst support can be maintained.

The 3D robocasting technique employed according to the present invention is well established and can be performed as described in U.S. Pat. Nos. 7,527,671, 6,027,326, 6,401,795, Catalysis Today 273 (2016), pages 234 to 243, or Journal of Catalysis 334 (2016), pages 110 to 115, or U.S. Pat. No. 6,993,406.

The 3D robocasting technique can be used with catalyst formulations which can be based on pastes that are currently used in standard extrusion techniques provided the particle size is small enough to pass the extrusion nozzle. The extrusion formulation or paste contains preformed catalytic materials, e.g. nickel precipitates, in which the nickel oxide particles are already present. If necessary, a binder can be added to the extrusion mixture.

The robocasting technique implies the extruding through one or more nozzles having a diameter of more than 0.2 mm, preferably more than 0.5 mm. Particularly preferably, the diameter of the nozzle should be in the range of from 0.75 mm to 2.5 mm, most preferably from 0.75 mm to 1.75 mm. The nozzle can have any desired cross-section, e.g. circular, elliptical, square, star-shaped, lobed. The maximum diameter is the largest diameter of a non-circular cross-section.

One of the main criteria for microextruding is the use of an extrudable paste that has the correct rheological properties for the microextruding technique. The above-mentioned literature gives detailed advice as how to obtain the required rheological properties.

If necessary, in the process according to the present invention, a viscosity adjusting agent can be employed. Typical viscosity adjusting agents are celluloses like carboxymethyl cellulose. Preferably, no viscosity adjusting agent or polymer is employed.

All commercially employed inorganic oxide catalyst support particles may be employed according to the present invention. Preferably, the inorganic oxide catalyst support is selected from the group consisting of diatomaceous earth, silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides or mixtures or blends thereof.

In addition to the above mentioned commercially employed inorganic oxide catalyst support particles (or mixtures thereof), a catalytically active material may be added as part of the inorganic oxide support (or mixtures thereof) or as an additional coating on the support structure or as several consecutive coatings. This catalytically active material may be composed of an number of the following elements: Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce, even if not all components are catalytically active.

The amount of catalytically active metal or metal alloy, which is based on the amount of support, is preferably in the range of from 0.1 to 95 wt %, more preferably 3 to 75 wt %, most preferably 8 to 65 wt %.

The suspension paste prepared in step a) of the process according to the present invention preferably has a solids content of 1 to 95 wt %, more preferably 10 to 65 wt %.

If necessary, a binder material for binding metal (oxide) and/or support particles together can be employed in the suspension paste. Preferred binder materials are selected from the group of inorganic binders such as clays, alumina, silica or mixtures thereof.

The amount of binder material in the suspension paste is preferably in the range of from 0.1 to 80 wt %, more preferably 1 to 15 wt %, based on the suspension paste.

Often, it is not necessary to additionally use organic binder materials in the suspension although their use is possible according to the invention. Therefore, preferably no organic binder material is present in the suspension.

The term "porous" employed here defines that the monolith is not a solid block of material but contains channels or pores.

The porosity is preferably at least 20%, more preferably at least 30% can preferably be in the range of from 20 to 90%, and can be determined by Hg-PV and He-density. It can be determined by the following formula. Porosity (%)=100–[(density of total microextruded structure/density of fiber material)×100]. The density of the total microextruded structure is determined by dividing its total weight by its total volume. The density of the fiber material can be determined by measuring Hg-PV and He-density.

Since the lattices or scaffolds formed from the fibers are self-supporting, open space remains between the fibers which leads to the porosity. Respective structures can be seen in the above-mentioned literature.

The robocasting process employed according to the present invention can also be described as 3D fiber deposition.

General Description of 3DFD

3D Fiber Deposition (3DFD) is used to shape powder of a catalyst, catalyst carrier or absorbent material. The 3DFD method is an adaptive manufacturing method whereby a highly loaded paste is extruded by a moving nozzle. By computer controlling the movement of the extrusion head in x, y and z-direction, a porous material can be produced from the extruded fibers or strands layer by layer. After drying, the porous material can be thermally dried.

The main benefit of this technology is the degree of freedom with regard to the porous parameters (fiber thickness, inter strand distance and stacking design).

The typical flow chart for the 3DFD technology consists of the following subsequent steps:
Prepare highly viscous paste
Extrude through thin nozzle
Computer controlled deposition of fibers to form a porous periodic structure
Drying and if necessary reducing The powder is mixed together with the solvent/diluent (e.g. water), if necessary binder and additives, thus obtaining a viscous paste. A good mixing to achieve a homogeneous paste (minimizing agglomerates or the incorporation of air bubbles) is a prerequisite for a smooth and reproducible process. The powder loading of the functional material depends on the specific surface area, the particle size distribution and the powder morphology. Generally, as the particle size of the powder decreases, the viscosity of the paste will increase. Therefore the solid loading needs to be lowered for these powders. Apart from organic or, preferably, inorganic binder(s), rheology modifiers can be added to control the rheological behavior of the paste. In some cases a defoamer is also added to avoid air bubbles in the paste.

After drying at room conditions (or under controlled atmosphere and temperature), the 3DFD structure is reduced, if necessary. No calcining or sintering at temperatures above 1000° C. is necessary.

The monolith of stacked fibers may shrink due to the heat treatment. This shrinkage could be in the range of 5-50% of the printing size of the "green" catalyst body.

The monolith of stacked catalyst fibers is three-dimensionally structured by depositing the extruded fibers in regular, recurring stacking pattern (periodically structured catalyst), to form a three-dimensionally structured porous catalyst monolith precursor.

Preferably, the regular, recurring stacking pattern is composed of stacked layers of extruded strands, wherein in each layer at least 60 wt % of the extruded strands are deposited parallel to each other and spatially separated from each other. The parallel deposition can be in straight or curved lines.

More preferably, at least 50 wt % of the extruded fibers are deposited as linear strands parallel to each other and spatially separated from each other, wherein the direction of the strands in each layer is different from the direction in neighboring layers, so that a porous structure with contact points of strands of neighboring stacks result.

The sides of the monolith structure may be perforated as a result of printing.

The points where the direction of the extrudate is changed or the layer in which the extrudate is deposited may have a larger diameter than the desired strand diameter. Though undesired, the diameter of an individual strand may also change in a parallel section of the shaped body due to a change in the printing speed.

The fibers or strands preferably have a thickness of 0.2 mm to 2.5 mm, more preferably of 0.5 mm to 2 mm, most preferably 0.75 mm to 1.75 mm.

They are preferably spatially separated from each other by a smaller first (primary) and at least one larger second (secondary) distance, wherein the first distance is determined by the formula:

$$m_1 = b * d$$

wherein ($m_1$), the primary distance between the fibers is determined by the strand diameter b multiplied by a factor d, wherein d is from 0.3 to 2, more preferably from 0.5 to 1.5, most preferably from 0.5 to 1. In examples 2, 4, 6, and 7, d=0.6667.

The larger secondary distances are calculated by the formula:

$$m_2 = m_1 * e$$

wherein $m_2$ is at least one of the secondary inter-strand distances, e is from 1.2 to 5, preferably 1.5 to 4, more preferably from 2 to 4. In examples 2, 4, 6, and 7, e=2.333.

The invention is further illustrated by the following examples.

Pressure Drop Simulations

EXAMPLES 1 TO 7

The correlation between pressure drop and catalyst monolith shape was calculated via numerical flow simulation (computational fluid dynamics—CFD), which completely resolves the flow in the void spaces between the solid catalyst structures. CFD simulations are a standard tool to calculate the pressure drop in complex 3D geometries. First, the geometry of the 3D microextruded (robocasted) catalyst monolith is created. For this purpose, a CAD (Computer Aided Design) model of a single catalyst body is created with a CAD program. For the calculation of the internal pressure drop the porous monoliths were virtually placed in tubes with the exact same cross-section, to exclude bypass flow around the monoliths. Pressure drop calculations were performed by simulating air flow at ambient temperature and different gas space velocities (GHSV, gas hourly space velocity). Values for the thermodynamic and transport properties of air at a constant operating pressure of 1 bar and a temperature of 20° C. were taken from the scientific literature.

Example 1

Figure 1:
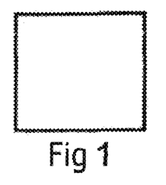
FIG. 1 shows the base outer perimeter of a desired square shape of a catalyst monolith.
Figure 2:
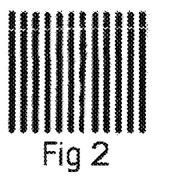
FIG. 2 shows a non-inventive layer design for a square catalyst monolith prepared using robocasting, wherein the parallel strands are equidistant.
Figure 3:
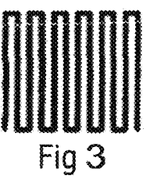
FIG. 3 shows a further non-inventive layer design for a square catalyst monolith prepared using robocasting, wherein the parallel (partial) strands are equidistant and deposited continuously as one single strand.
Figure 4:
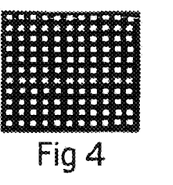
FIG. 4 shows a non-inventive square catalyst monolith design in a top view with channels perpendicular to the layers. A minimum of two layers, according to either
Figure 5:
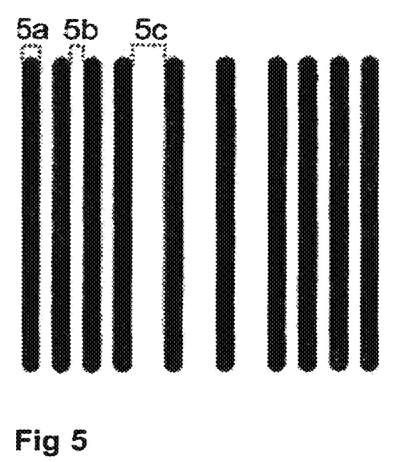
FIG. 5 shows an improved layer pattern for a square catalyst monolith according to the invention. 5*a* denotes the diameter of the strands, 5b denotes the primary inter-strand distance and 5c the secondary inter-strand distance.
Figure 6:
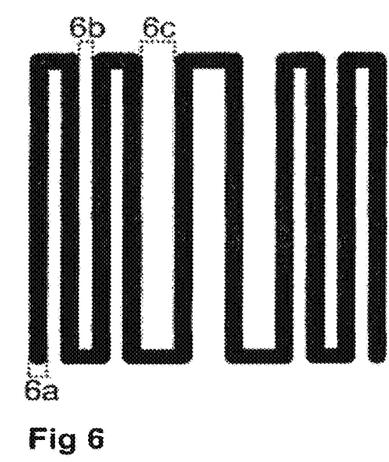
FIG. 6 shows another improved layer pattern according to the invention, wherein the parallel (partial) strands are deposited continuously as one single strand. 6a denotes the diameter of the strands, 6b denotes the primary inter-strand distance and 6c the secondary inter-strand distance.

Comparative square catalyst monolith; the layer structure of the catalyst monolith is shown in FIG. 4.
Strand diameter: 1.293 mm
Inter-strand distance: 0.862 mm
Smallest cross-sectional diameter: 25 mm
Porosity across shape geometry in the direction of channels: ε=0.425
Surface area/volume: 1488 m$^2$/m$^3$
Consecutive layers printed: 24
Pressure drop of a single monolith (no bypass around monolith), monolith inside a tube with the
same cross section
Gas: air (constant material properties)
Density: ρ=1,205 kg/m$^3$
Viscosity: η=1,82E-05 Pa*s
Empty pipe velocity: v0 [m/s]={0.12, 0.25, 0.5, 1, 2, 4}

Example 2

Figure 7:
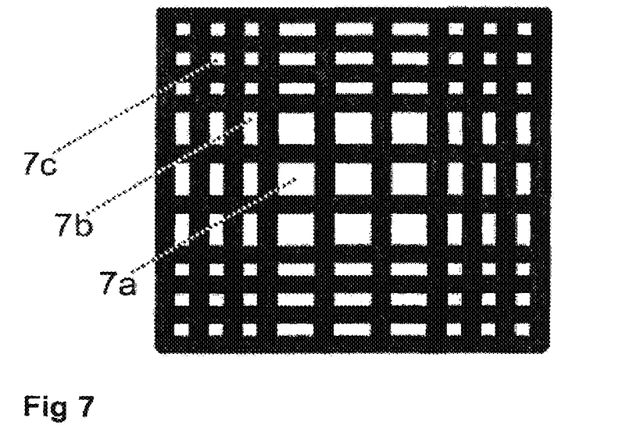
FIG. 7 shows an improved catalyst monolith design in a top view with channels 7a, 7b and 7c perpendicular to the layers. A minimum of two layers, according to either
Figure 8:
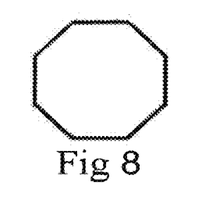
FIG. 8 shows the base outer perimeter of a desired octagon shape of a catalyst monolith.
Figure 9:
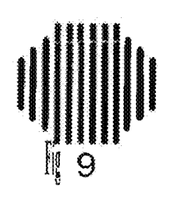
FIG. 9 shows a non-inventive layer design for an octagonal catalyst monolith prepared using robocasting, wherein the parallel strands are equidistant.
Figure 10:
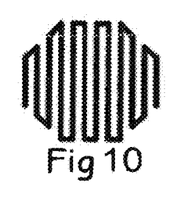
FIG. 10 shows a further non-inventive layer design for an octagonal catalyst monolith prepared using robocasting, wherein the parallel (partial) strands are equidistant and deposited continuously as one single strand.

Inventive square catalyst monolith; the layer structure of the catalyst monolith is shown in FIG. 7.
Strand diameter: 1.293 mm
Primary inter-strand distance: 0.862 mm
Secondary inter-strand distance: 3.017 mm
Smallest cross-sectional diameter: 25 mm
Porosity across shape geometry in the direction of channels: ε=0.536
Surface area/volume: 1278 m$^2$/m$^3$
Consecutive layers printed: 24
Ratio of primary inter-strand distance to secondary inter-strand distance: 1:3.5
Factor c: 2.9
Factor d: 0.6667
Factor e: 2.333
Pressure drop of a single monolith (no bypass around monolith), monolith inside a tube with the
same cross section
Gas: air (constant material properties)
Density: ρ=1,205 kg/m$^3$
Viscosity: η=1,82E-05 Pa*s
Empty pipe velocity: v0 [m/s]={0.12, 0.25, 0.5, 1, 2, 4}

Example 3

Figure 11:
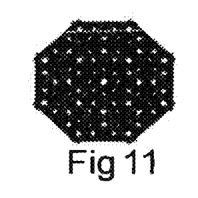
Figure 12:
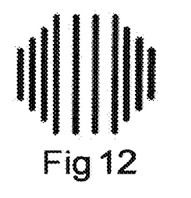
FIG. 12 shows an improved layer pattern for an octagonal catalyst monolith according to the invention, wherein the parallel (partial) strands are deposited continuously as one single strand and have primary and secondary inter-strand distances.
Figure 13:
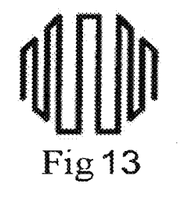
FIG. 13 shows another improved layer pattern for an octagonal catalyst monolith according to the invention having primary and secondary inter-strand distances.

Comparative octagonal catalyst monolith; the layer structure of the catalyst monolith is shown in FIG. 11.
Strand diameter: 1.293 mm
Inter-strand distance: 0.862 mm
Smallest cross-sectional diameter: 25 mm
Porosity across shape geometry in the direction of channels: ε=0.453
Surface area/volume: 1489 m$^2$/m$^3$
Consecutive layers printed: 24
Pressure drop of a single monolith (no bypass around monolith), monolith inside a tube with the same cross
section
Gas: air (constant material properties)
Density: ρ=1.205 kg/m$^3$
Viscosity: η=1.82E-05 Pa*s
Empty pipe velocity: v0 [m/s]={0.12, 0.25, 0.5, 1, 2, 4}

Example 4

Figure 14:
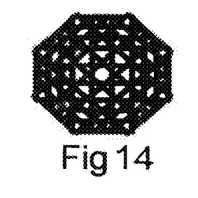
Figure 15:
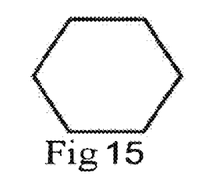
FIG. 15 shows the base outer perimeter of a desired hexagon shape of a catalyst monolith.
Figure 16:
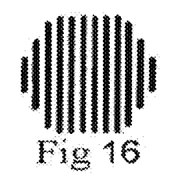
FIG. 16 shows a non-inventive layer design for a hexagonal catalyst monolith prepared using robocasting, wherein the parallel strands are equidistant.
Figure 17:
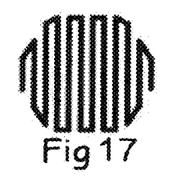
FIG. 17 shows a further non-inventive layer design for a hexagonal catalyst monolith prepared using robocasting, wherein the parallel (partial) strands are equidistant and deposited continuously as one single strand.

Inventive octagonal catalyst monolith; the layer structure of the catalyst monolith is shown in FIG. 14.
Strand diameter: 1.293 mm
Primary inter-strand distance: 0.862 mm
Secondary inter-strand distance: 3.017 mm
Smallest cross-sectional diameter: 25 mm
Porosity across shape geometry in the direction of channels E=0.553
Surface area/volume: 1248 m$^2$/m$^3$
Consecutive layers printed: 24
Factor c: 2.9
Factor d: 0.6667
Factor e: 2.333
Pressure drop of a single monolith (no bypass around monolith), monolith inside a tube with the same cross
section
Gas: air (constant material properties)
Density: ρ=1.205 kg/m$^3$
Viscosity: η=1.82E-05 Pa*s
Empty pipe velocity: v0 [m/s]={0.12, 0.25, 0.5, 1, 2, 4}

Example 5

Figure 18:
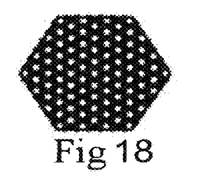
Figure 19:
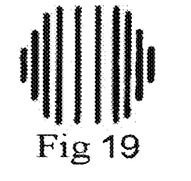
FIG. 19 shows an improved layer pattern for a hexagonal catalyst monolith according to the invention having primary and secondary inter-strand distances.
Figure 20:
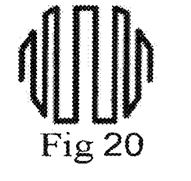
FIG. 20 shows another improved layer pattern for a hexagonal catalyst monolith according to the invention, wherein the parallel (partial) strands are deposited continuously as one single strand and have primary and secondary inter-strand distances.

Comparative hexagonal catalyst monolith; the layer structure of the catalyst monolith is shown in FIG. 18.
Strand diameter: 1.293 mm
Inter-strand distance: 0.862 mm
Smallest cross-sectional diameter: 25 mm
Porosity across shape geometry in the direction of channels E=0.464
Surface area/volume: 1478 m$^2$/m$^3$
Consecutive layers printed 24

Pressure drop of a single monolith (no bypass around monolith), monolith inside a tube with the same cross section Material: air (constant material properties)
Density: $\rho=1.205$ kg/m$^3$
Viscosity: $\eta=1.82E-05$ Pa*s
Empty pipe velocity: v0 [m/s]={0.12, 0.25, 0.5, 1, 2, 4}

Empty pipe velocity: v0 [m/s]={0.12, 0.25, 0.5, 1, 2, 4}

The results of Examples 1 to 7 are summarized in Table 1

TABLE 1

| Pipe Velocity in an empty pipe (m/s) | Pressure Drop (mbar/m) | | | | | | |
|---|---|---|---|---|---|---|---|
| | Example 1 | Example 2 | Example 3 | Example 4 | Example 5 | Example 6 | Example 7 |
| 0.12 | 1.73 | 0.72 | 2.01 | 0.92 | 1.76 | 0.78 | 0.59 |
| 0.25 | 3.99 | 1.73 | 4.88 | 2.37 | 4.11 | 1.98 | 1.57 |
| 0.5 | 9.85 | 4.5 | 12.87 | 6.71 | 10.36 | 5.53 | 4.63 |
| 1 | 29.83 | 13.48 | 35.95 | 19.97 | 28.95 | 16.89 | 14.39 |
| 2 | 99.13 | 50.5 | 104.19 | 60.13 | 94.75 | 53.32 | 45.14 |
| 4 | 304.72 | 165.99 | 307.68 | 185.17 | 296.17 | 171.67 | 139.21 |

Example 6

Figure 21:
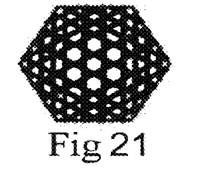
Figure 22:
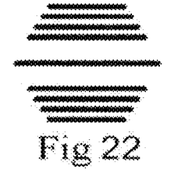
FIG. 22 shows another improved layer pattern for a hexagonal catalyst monolith according to the invention having primary and secondary inter-strand distances.
Figure 23:
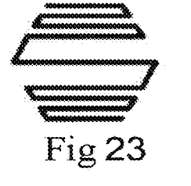
FIG. 23 shows another improved layer pattern for a hexagonal catalyst monolith according to the invention, wherein the parallel (partial) strands are deposited continuously as one single strand and have primary and secondary inter-strand distances.

Inventive hexagonal catalyst monolith; the layer structure of the catalyst monolith is shown in FIG. 21.
Fiber diameter: 1.293 mm
Primary inter-fiber distance: 0.862 mm
Secondary inter-fiber distance: 3.017 mm
Smallest cross-sectional diameter: 25 mm
Porosity across shape geometry in the direction of channels: $\varepsilon=0.56$
Surface area/volume: 1235 m$^2$/m$^3$
Consecutive layers printed: 24
Factor c: 2.9
Factor d: 0.6667
Factor e: 2.333
Pressure drop of a single monolith (no bypass around pellet), monolith inside a tube with the same cross section
Gas: air (constant material properties)
Density: $\rho=1.205$ kg/m$^3$
Viscosity: $\eta=1.82E-05$ Pa*s
Empty pipe velocity: v0 [m/s]={0.12, 0.25, 0.5, 1, 2, 4}

Example 7

Figure 24:
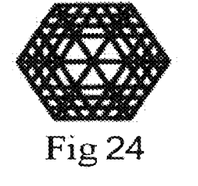
Figure 25:
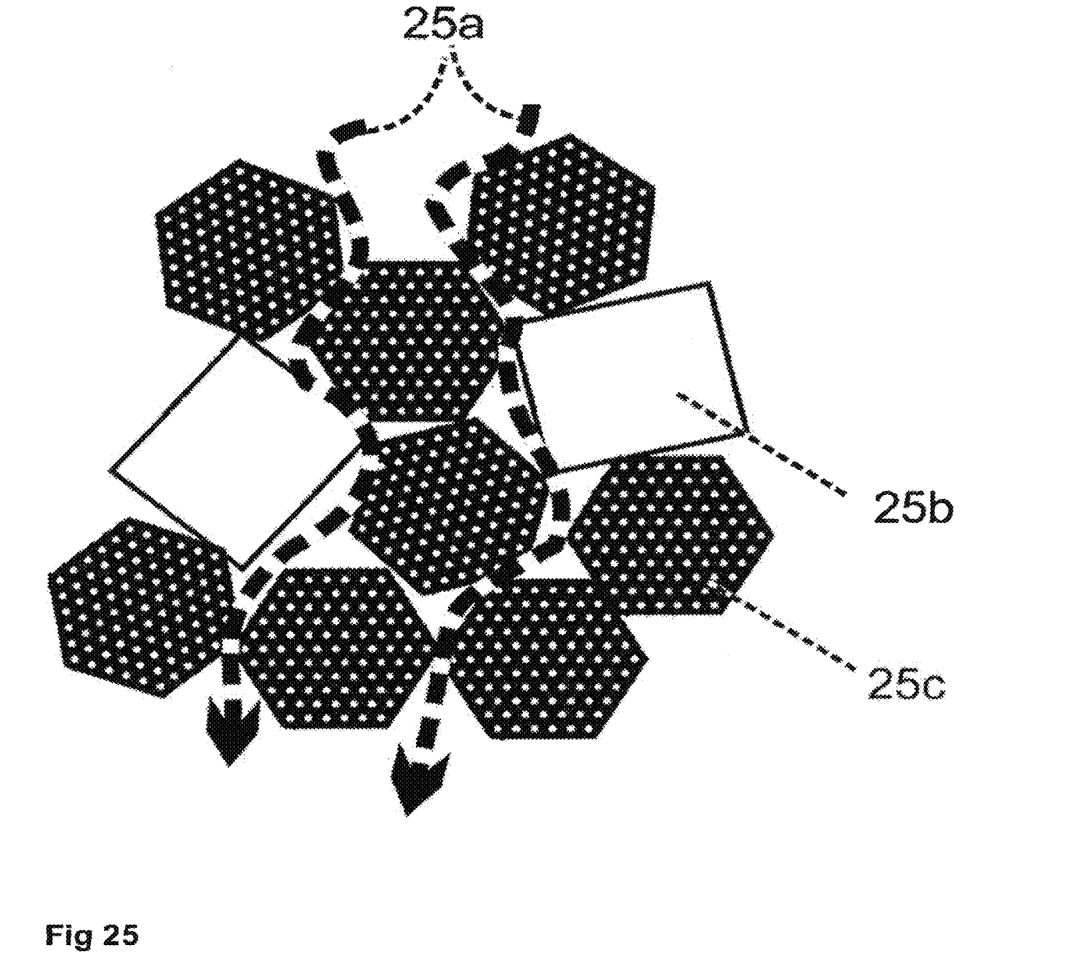
FIG. 25 shows the potential flow pattern of a gas flow across a packed bed of non-inventive catalyst monoliths inside a reactor. The illustration shows the gas flow (25a) bypassing the center of the robocasted monolith structures (25b and 25c). In this case the increased surface area of the catalyst monoliths is not fully utilized due to channeling of the gas flow around the monolith structures.
Figure 26:
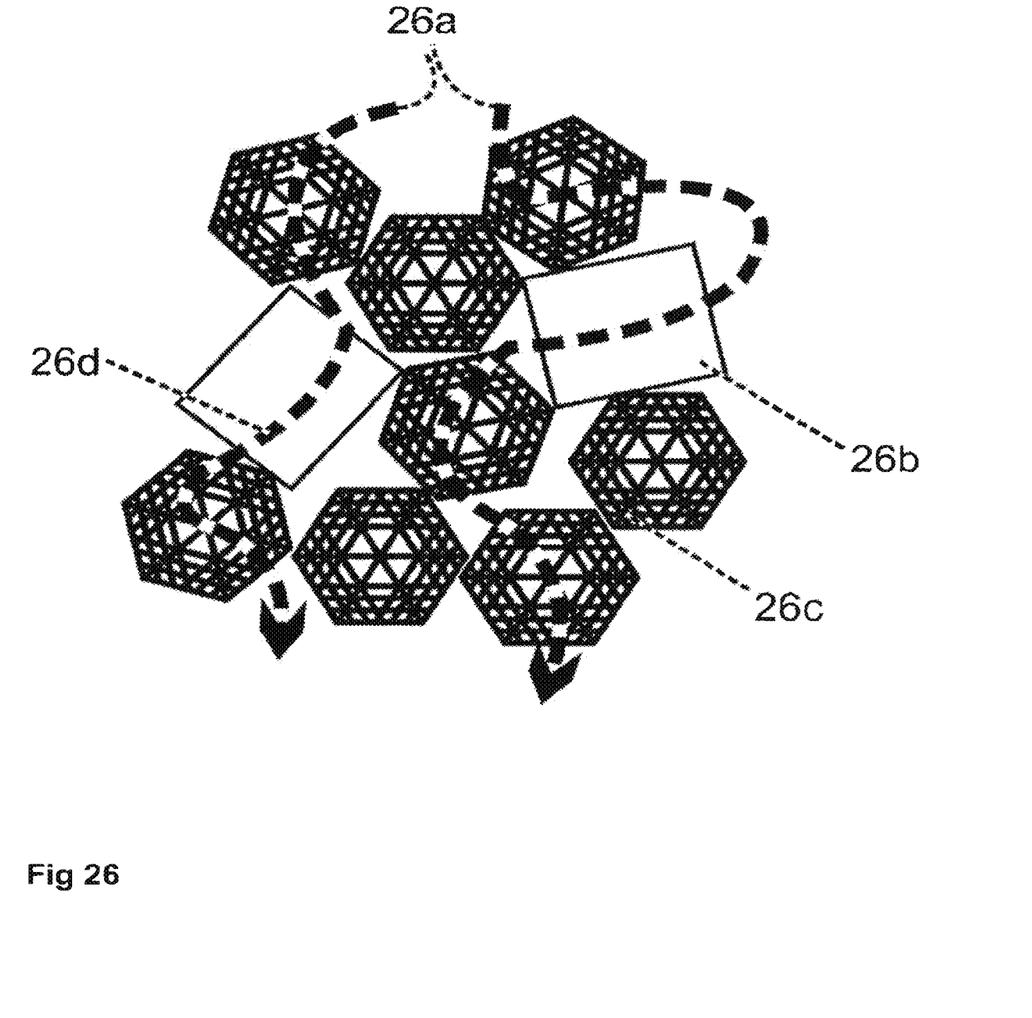
FIG. 26 shows the preferential flow pattern of a gas flow across a packed catalyst bed of inventive catalyst monoliths inside a reactor. The illustration shows the gas flow (26a) entering the center of the printed structures (26b and 26c). 26d denotes the flow passing through the center of one of the hexagonal monolith structures. In this case the increased surface area is accessible to the gas flow due to a low pressure drop across each individual monolith structure.

Inventive hexagonal catalyst monolith; the layer structure of the catalyst monolith is shown in FIG. 24.
Strand diameter: 1.293 mm
Primary inter-fiber distance: 0.862 mm
Secondary inter-fiber distance: 3.017 mm
Smallest cross-sectional diameter: 25 mm
Porosity across shape geometry in the direction of channels E=0.6
Surface area/volume: 1114 m$^2$/m$^3$
Consecutive layers printed: 24
Factor c: 2.9
Factor d: 0.6667
Factor e): 2.333
Pressure drop of a single monolith (no bypass around monolith), monolith inside a tube with the same cross section
Gas: air (constant material properties)
Density: $\rho=1.205$ kg/m$^3$
Viscosity: $\eta=1.82E-05$ Pa*s Extruded Monoliths

Example 8

Figure 27:
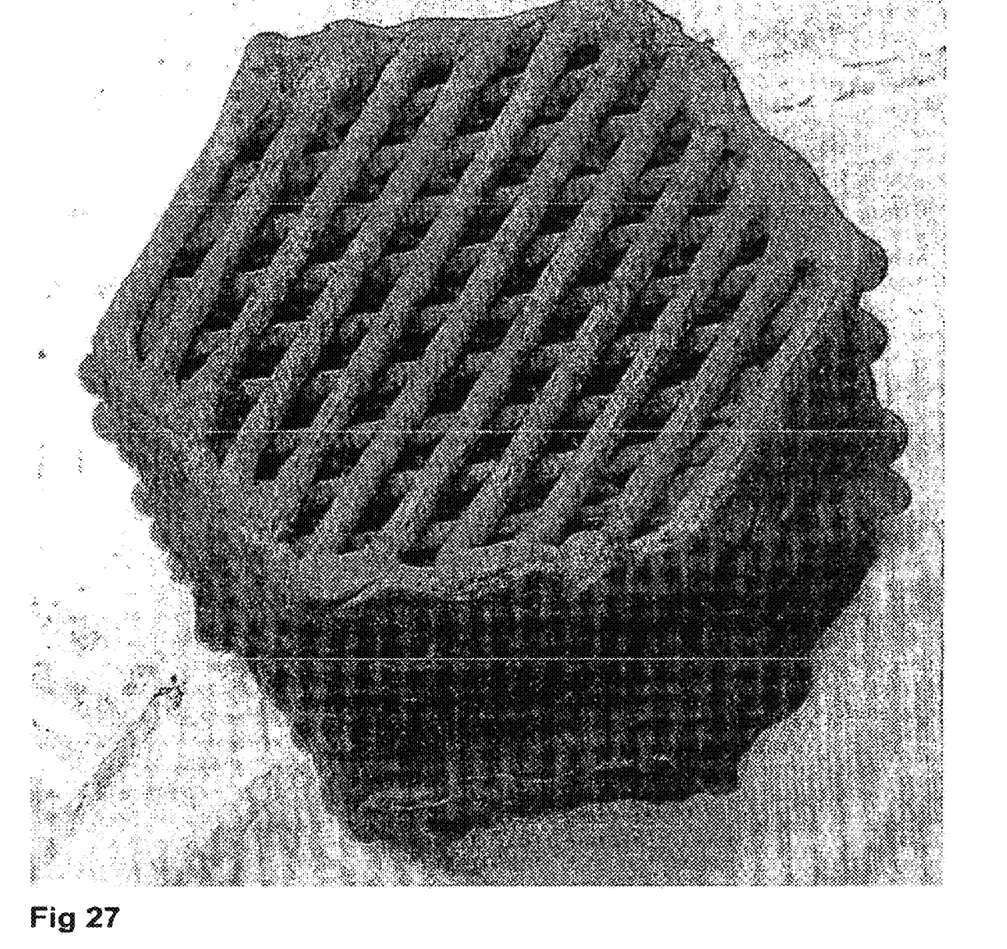
FIG. 27 shows, in a perspective view, an example of a robocasted hexagonal catalyst monolith having a state of the art layer design, wherein the parallel (partial) strands are equidistant and deposited continuously as one single strand in each layer. Layers are deposited at 60° and 120°, respectively, to one another. The parallel strands are oriented parallel to the sides of the hexagon.

Comparative hexagonal catalyst monolith shown in FIG. 27
Material: Diatomaceous earth containing a vanadium active phase with sodium and potassium as promotor compounds
Fiber diameter before heat treatment: 1.5 mm
Inter-fiber distance before heat treatment before heat treatment: 1.5 mm
Smallest cross-sectional diameter: 25 mm
Consecutive layers printed: 22
Shrinkage on heat treatment: 20%
Pressure during extrusion: 50-70 N

Example 9

Figure 28:
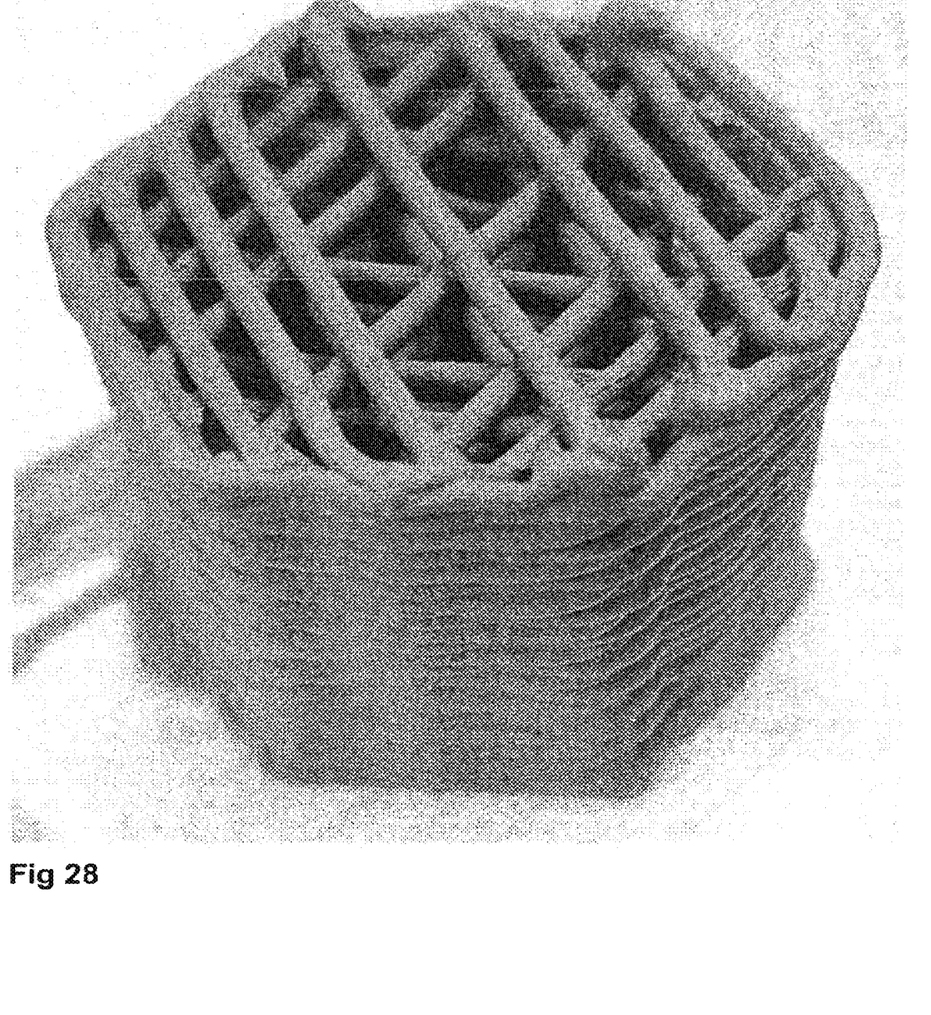
FIG. 28 shows, in a perspective view, an example of a robocasted hexagonal catalyst monolith having an improved layer pattern according to the invention, wherein the parallel (partial) strands are deposited continuously as one single strand and have primary and secondary inter-strand distances. The layers are deposited at 60° and 120°, respectively, to one another. The parallel strands are oriented parallel to the sides of the hexagon.
Figure 29:
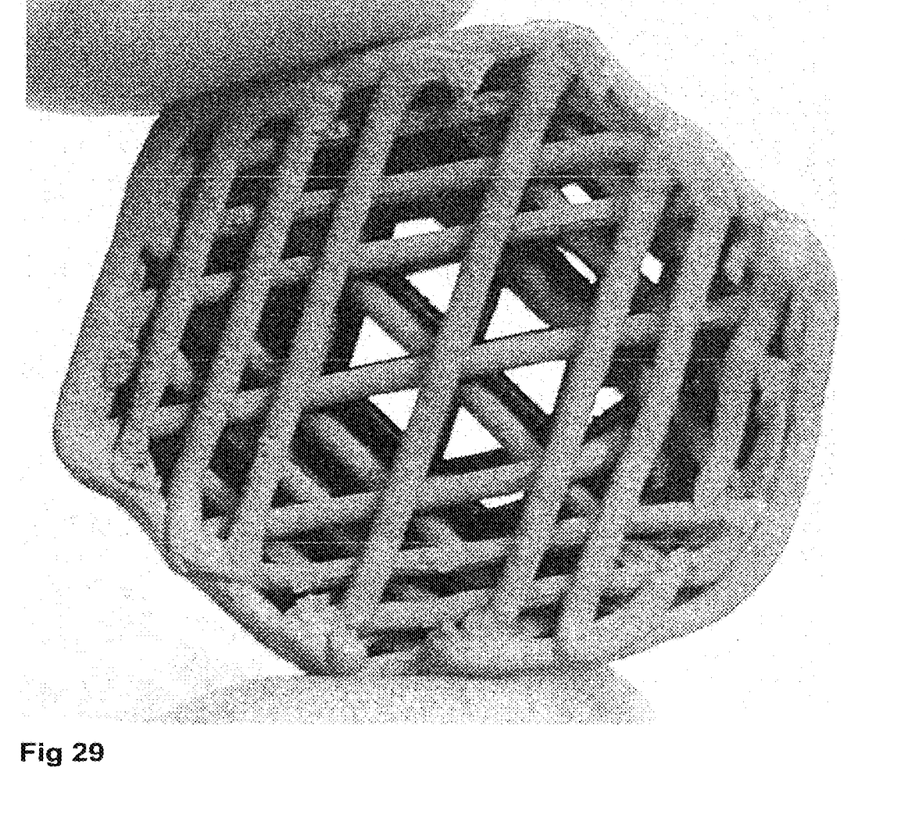
FIG. 29 shows the monolith of FIG. 28 in a top view.

Inventive hexagonal catalyst monolith shown in FIGS. 28 and 29
Material: Diatomaceous earth containing a vanadium active phase with sodium and potassium as promotor compounds
Fiber diameter before heat treatment: 1.5 mm
Primary inter-fiber distance before heat treatment: 1.5 mm
Secondary inter-fiber distance before heat treatment: 4.5 mm
Smallest cross-sectional diameter: 25 mm
Consecutive layers printed: 22
Shrinkage on heat treatment: 20%
Pressure during extrusion: 50-70 N

Example 10

Figure 30:
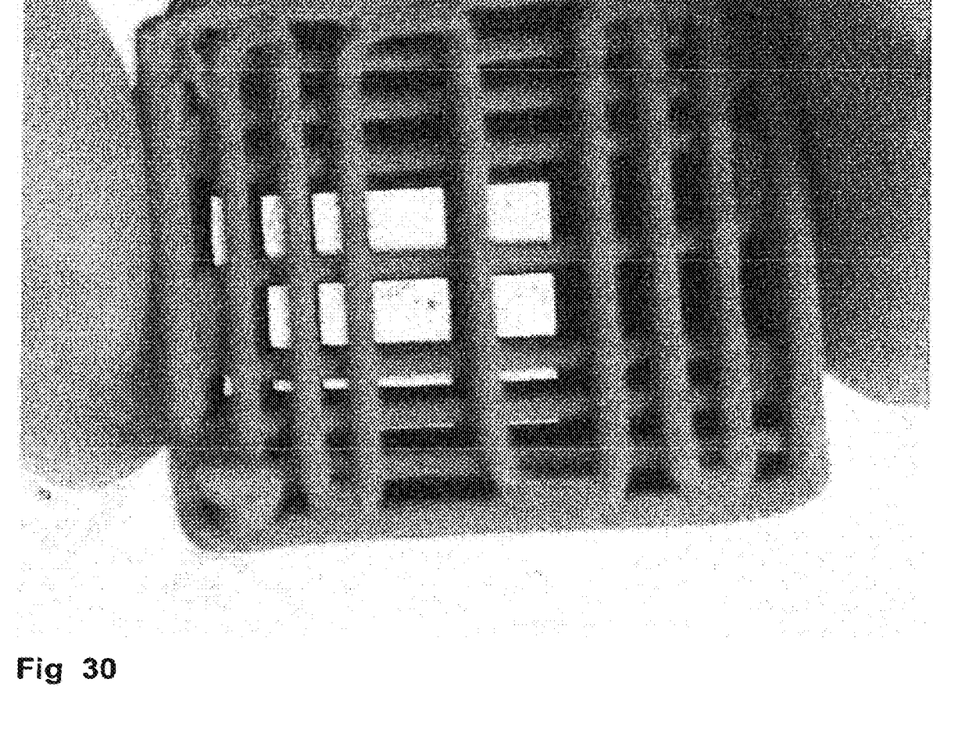
FIG. 30 shows, in a top view, an example of a robocasted square catalyst monolith according to the invention, wherein the parallel (partial) strands are deposited continuously as one single strand and have primary and secondary inter-strand distances.

Inventive square catalyst monolith shown in FIG. 30
Material: Diatomaceous earth containing a vanadium active phase with sodium and potassium as promotor compounds
Fiber diameter before heat treatment: 1.5 mm
Primary inter-fiber distance before heat treatment: 1.5 mm
Secondary inter-fiber distance before heat treatment: 4.5 mm
Smallest cross-sectional diameter: 25 mm
Consecutive layers printed: 22
Shrinkage on heat treatment: 20%
Pressure during extrusion: 50-70 N

The invention claimed is:

1. A three-dimensional porous catalyst, catalyst carrier or absorbent monolith of stacked strands of catalyst, catalyst carrier or absorbent material, composed of alternating layers of linear spaced-apart parallel strands, wherein the strands in alternating layers are oriented at an angle to one another, wherein the distance between inner spaced-apart parallel strands is larger than the distance between outer spaced-apart parallel strands in at least a part of the layers of the monolith.

2. The monolith of claim 1, wherein the strands are arranged in alternating layers comprising first and second alternate layers, wherein the strands in the first alternate layers and in the second alternate layers are each aligned, and wherein the strands in the alternate layers are orthogonal to one another.

3. The monolith of claim 1, wherein the strands are arranged in alternating layers comprising first, second and third alternate layers, wherein the strands in the first alternate layers, in the second alternate and in the third alternate layers are each aligned, and wherein the strands in the alternate layers are oriented at 60° and 120°, respectively, to one another.

4. The monolith of claim 1, wherein the strands are arranged in alternating layers comprising first, second, third and fourth alternate layers, wherein the strands in the first alternate layers, in the second alternate, in the third alternate layers and in the fourth alternate layers are each aligned, and wherein the strands in the alternate layers are oriented at 45°, 90° and 135° respectively, to one another.

5. The monolith of claim 1, wherein in some or all of the layers a strand is arranged that forms a frame of the layer defining the outer periphery of the catalyst monolith.

6. The monolith of claim 1, wherein the strands contain an inorganic oxide catalyst support material selected from the group consisting of silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides and mixtures or blends thereof.

7. The monolith of claim 1, wherein the strands contain a catalytically active metal selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce and mixtures or alloys thereof.

8. A randomly packed catalyst bed, comprising porous catalyst monoliths of stacked catalyst strands according to claim 1.

9. A method for producing a three-dimensional porous catalyst, catalyst carrier or absorbent monolith of stacked strands of catalyst, catalyst carrier or absorbent material, comprising the following steps:
   a) preparing a paste of metal, metal alloy, metal compound particles of catalytically active metal or catalyst support particles in a liquid diluent, in which the metal, metal alloy or metal compound particles can be supported on or mixed with catalyst support particles, and which paste can optionally comprise a binder material,
   b) extruding the paste of step a) through one or more nozzles having a diameter larger than 500 µm to form strands, and depositing the extruded strands in alternating layers of linear spaced-apart parallel strands, wherein the alternating layers are oriented at an angle to one another, to form a three-dimensional porous monolith precursor,
   c) drying the porous monolith precursor to remove the liquid diluent,
   d) optionally, for producing a three-dimensional porous catalyst, reducing metal oxide(s) in the porous monolith precursor to form the catalytically active metal or metal alloy, or additional heat treatment to produce a catalytically active material,
   wherein the distance between inner spaced-apart parallel strands is larger than the distance between outer spaced-apart parallel strands in at least a part of the layers of the monolith.

10. The method of claim 9, wherein the strands are deposited in alternating layers comprising first and second alternate layers, wherein the strands in the first alternate layers and in the second alternate layers are each aligned, and wherein the strands in the alternate layers are orthogonal to one another.

11. The method of claim 10, wherein the catalyst monolith has a square or rectangular cross-section.

12. The method of claim 9, wherein the strands are deposited in alternating layers comprising first, second and third alternate layers, wherein the strands in the first alternate layers, in the second alternate and in the third alternate layers are each aligned, and wherein the strands in the alternate layers are oriented at 600 and 120°, respectively, to one another.

13. The method of claim 12, wherein the catalyst monolith has a hexagonal cross-section.

14. The method of claim 9, wherein the strands are deposited in alternating layers comprising first, second, third and fourth alternate layers, wherein the strands in the first alternate layers, in the second alternate, in the third alternate layers and in the fourth alternate layers are each aligned, and wherein the strands in the alternate layers are oriented at 45°, 90°, and 135°, respectively, to one another.

15. The method of claim 14, wherein catalyst monolith has an octagonal cross-section.

16. The method according to claim 9, wherein parallel strands are deposited continuously as partial strands of one single individual strand in each layer.

17. The method according to claim 9, wherein more than one layer of the catalyst monolith is deposited continuously as one single individual strand.

18. The method according to claim 9, wherein the outer periphery of the catalyst monolith is created by depositing in some or all of the layers a strand that forms a frame of the layer defining the outer periphery of the catalyst monolith.

19. The method according to claim 9, wherein no temperature treatment of the porous catalyst monolith precursor or porous catalyst monolith at temperatures above 1000° C. is performed.

20. The method according to claim 9, wherein the inorganic oxide catalyst support is selected from the group consisting of silicon dioxide, aluminium oxide, titanium dioxide, zirconium dioxide, magnesium oxide, calcium oxide, mixed metal oxides, hydrotalcites, spinels, perovskites, metal phosphates, silicates, zeolites, steatite, cordierite, carbides, nitrides and mixtures or blends thereof.

21. The method according to claim 9, wherein the catalytically active metal is selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce and mixtures or alloys thereof.

22. The method according to claim 9, wherein a binder material is employed, selected from the group consisting of inorganic binders.

23. A three-dimensional porous catalyst monolith of stacked catalyst fibers, obtained by the method according to claim 9.

* * * * *